US011318983B2

(12) United States Patent
Kwon et al.

(10) Patent No.: US 11,318,983 B2
(45) Date of Patent: May 3, 2022

(54) STEERING COLUMN HAVING FOLDABLE STEERING WHEEL STRUCTURE

(71) Applicant: MANDO CORPORATION, Pyeongtaek-si (KR)

(72) Inventors: HyunBi Kwon, Yongin-si (KR); SeungWoo Cheon, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/243,985

(22) Filed: Apr. 29, 2021

(65) Prior Publication Data
US 2021/0339792 A1 Nov. 4, 2021

(30) Foreign Application Priority Data

Apr. 29, 2020 (KR) .................. 10-2020-0052493
Apr. 21, 2021 (KR) .................. 10-2021-0051952

(51) Int. Cl.
B62D 1/185 (2006.01)
B62D 1/10 (2006.01)

(52) U.S. Cl.
CPC .............. B62D 1/185 (2013.01); B62D 1/10 (2013.01)

(58) Field of Classification Search
CPC .......... B62D 1/185; B62D 1/10; B62D 1/181; B62D 1/183
See application file for complete search history.

(56) References Cited

U.S. PATENT DOCUMENTS

| 11,247,713 | B2 * | 2/2022 | Nozawa | B62D 1/181 |
| 2007/0290494 | A1 * | 12/2007 | Ichikawa | B62D 1/10 74/555 |
| 2018/0273081 | A1 * | 9/2018 | Lubischer | B62D 15/025 |
| 2021/0016820 | A1 * | 1/2021 | Nozawa | B62D 1/183 |
| 2021/0031823 | A1 * | 2/2021 | Watanabe | B62D 1/183 |
| 2021/0316777 | A1 * | 10/2021 | Kwon | B62D 1/183 |

* cited by examiner

*Primary Examiner* — Drew J Brown
(74) *Attorney, Agent, or Firm* — Hauptman Ham, LLP

(57) ABSTRACT

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

13 Claims, 11 Drawing Sheets

STEERING COLUMN HAVING FOLDABLE STEERING WHEEL STRUCTURE

CROSS-REFERENCE TO RELATED APPLICATION

This application claims priority from Korean Patent Application Nos. 10-2020-0052493, filed on Apr. 29, 2020 and 10-2021-0051952, filed on Apr. 21, 2021, which is hereby incorporated by reference for all purposes as if fully set forth herein.

BACKGROUND

Field

Embodiments relate to a steering column with a foldable steering wheel structure, and more specifically, to a steering column having a foldable steering wheel structure in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering.

Description of Related Art

In recent years, there have been developed automobiles that may navigate to the destination without the driver's manipulation of the steering wheel, accelerator pedal, and brake.

An autonomous vehicle may drive in driver driving mode or autonomous driving mode. In driver driving mode, the driver performs driving. In autonomous driving mode, driving is automatically performed by the autonomous driving system. There is demand for securing a larger space for convenience of the driver during autonomous driving.

If the driving wheel which is positioned in front of the driver is received in the vehicle body in autonomous driving mode, the driver would have more convenience in driving. Since the autonomous vehicle drives in driver driving mode or autonomous driving mode, a need exists for a driving wheel structure that allows the driver to manipulate the driving wheel in driver driving mode, as do conventional, non-autonomous vehicles and that may easily be received in the vehicle body in driver driving mode.

BRIEF SUMMARY

According to embodiments of the disclosure, there is provided a steering column having a foldable steering wheel structure, in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering.

According to an embodiment, there may be provided a steering column having a foldable steering wheel structure, comprising a shaft crossing and coupled to a steering shaft, a driver for moving the steering shaft in a telescopic direction, a rotation bracket including at least one shaft coupler rotatably coupled to the shaft, a steering wheel coupler to which a steering wheel is coupled, and a guide rod spaced apart from the shaft in a direction perpendicular to an axial direction of the steering shaft, and a guide bracket including a guide slit through which the guide rod enters or exits as the steering shaft moves in the telescopic direction.

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
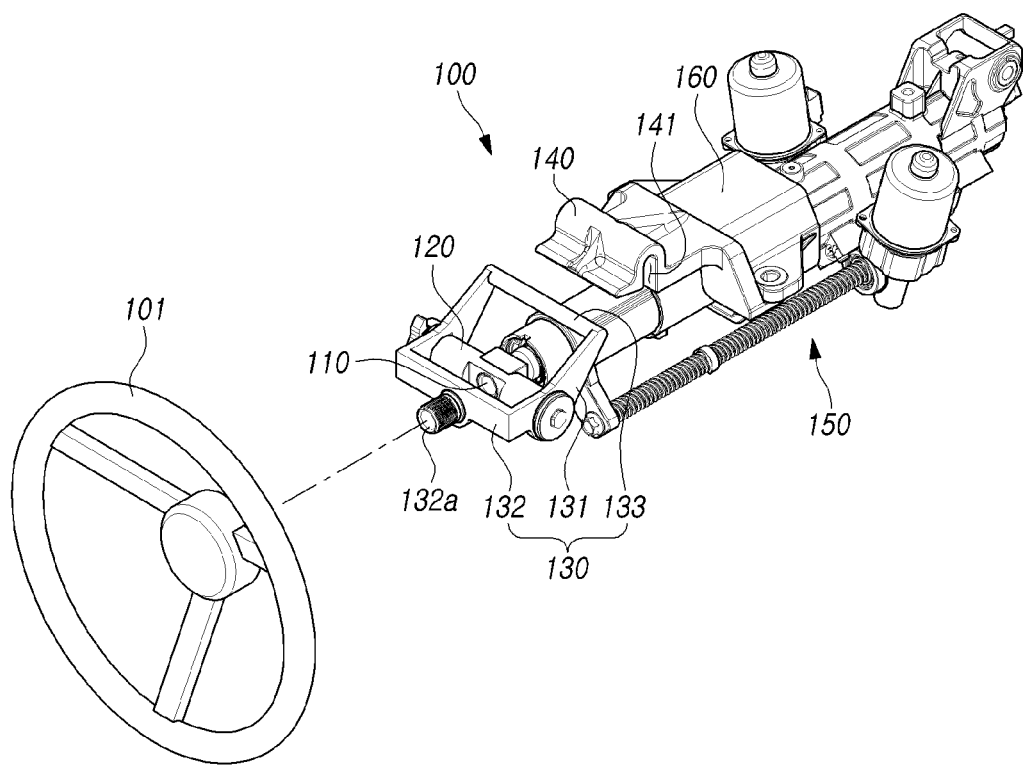
FIG. 1 is a perspective view illustrating a steering column according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
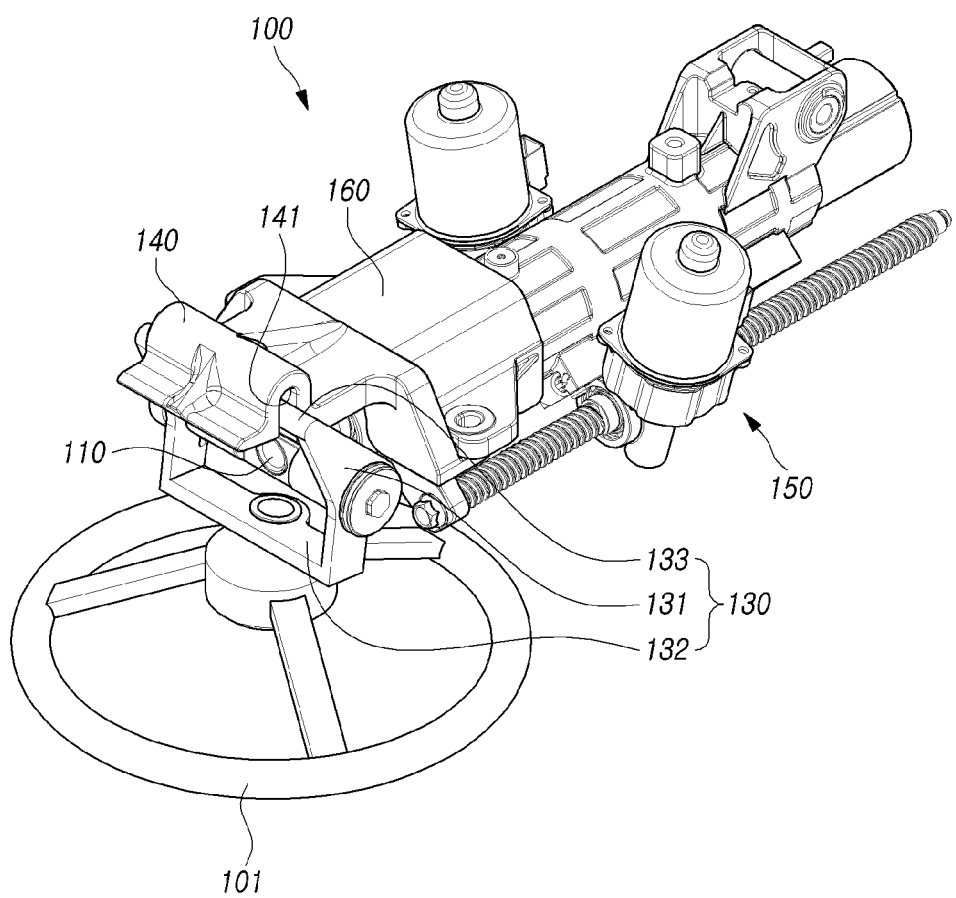
FIG. 2 is a perspective view illustrating a folded state of the steering wheel of FIG. 1.
Figure 3:
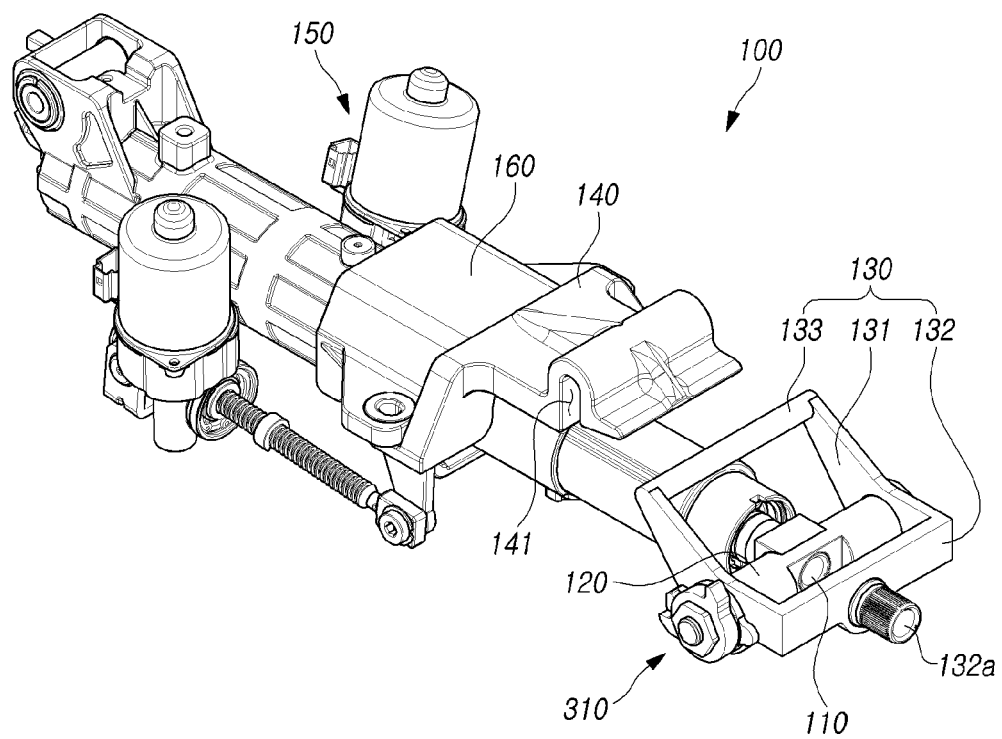
FIG. 3 is a perspective view illustrating a steering column according to an embodiment.
Figure 4:
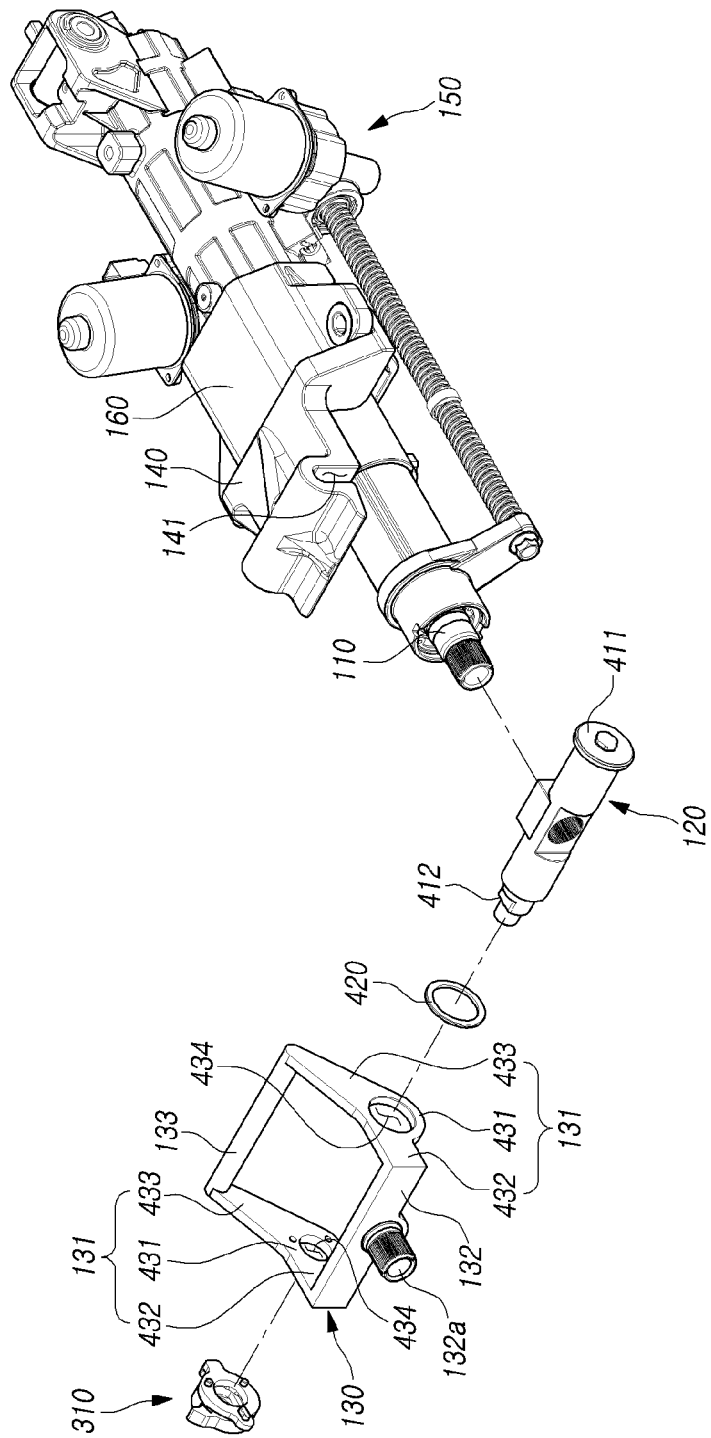
FIG. 4 is an exploded perspective view of FIG. 1.
Figure 5:
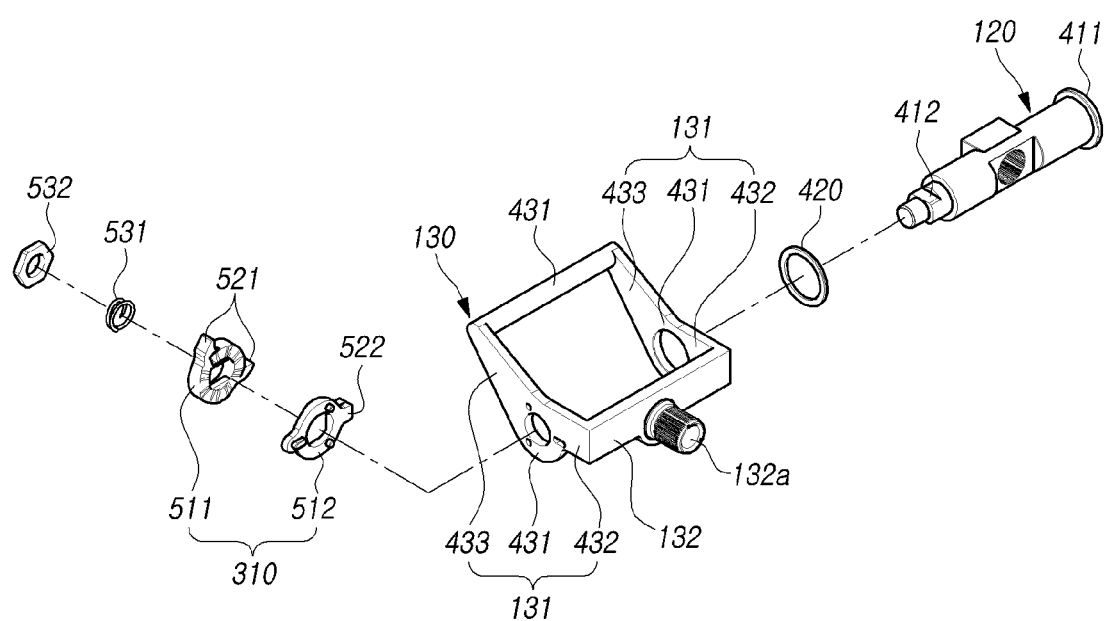
FIG. 5 is an exploded perspective view illustrating a portion of a steering column according to an embodiment.
Figure 6:
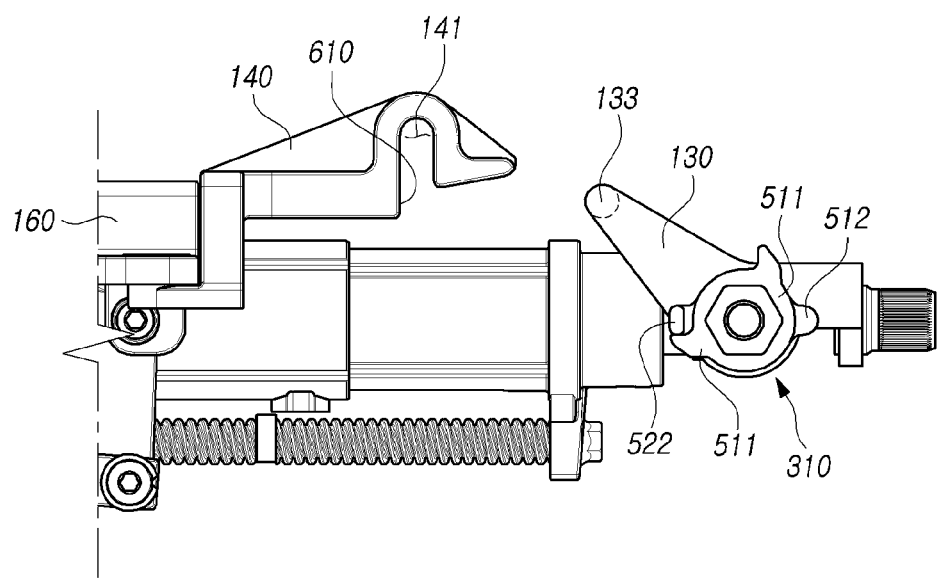
FIG. 6 is a side view illustrating a steering column according to an embodiment.
Figure 7:
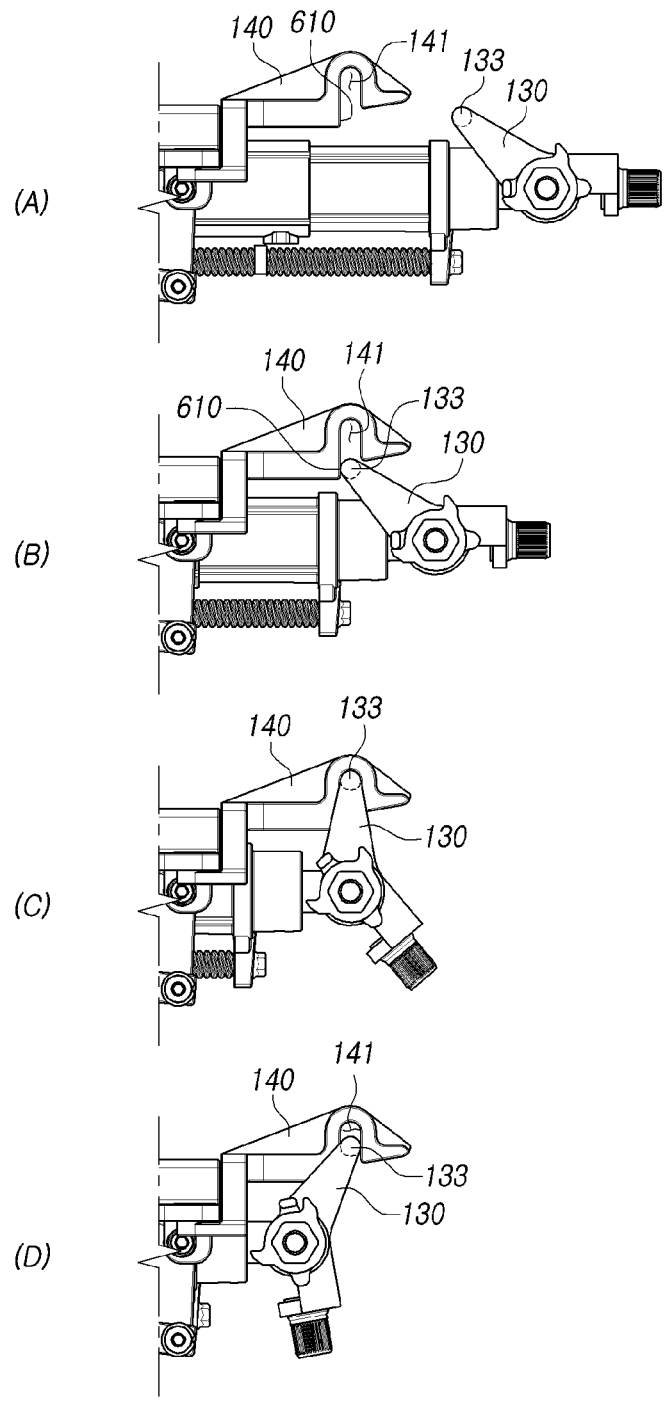
FIG. 7 is a view illustrating an operation state of FIG. 6.
Figure 8:
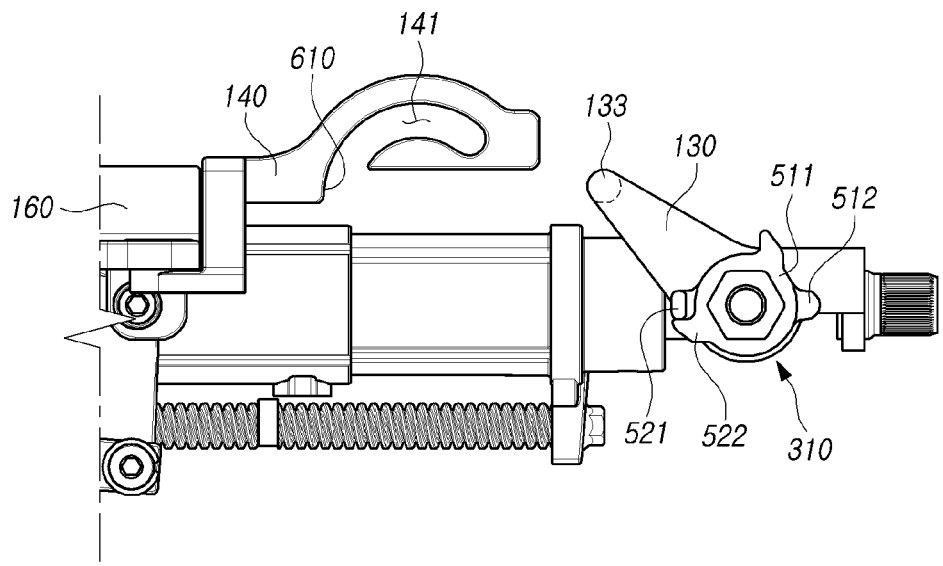
FIG. 8 is a side view illustrating a steering column according to an embodiment.
Figure 9:
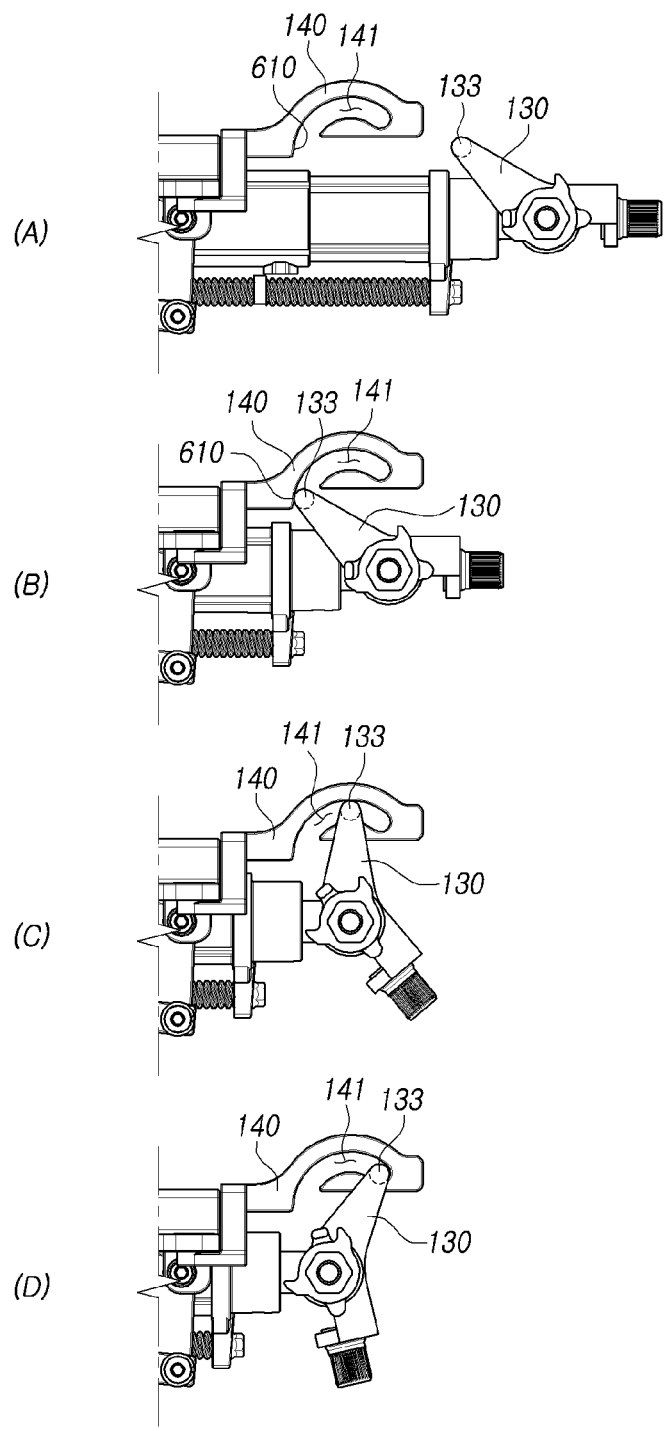
FIG. 9 is a view illustrating an operation state of FIG. 8.
Figure 10:
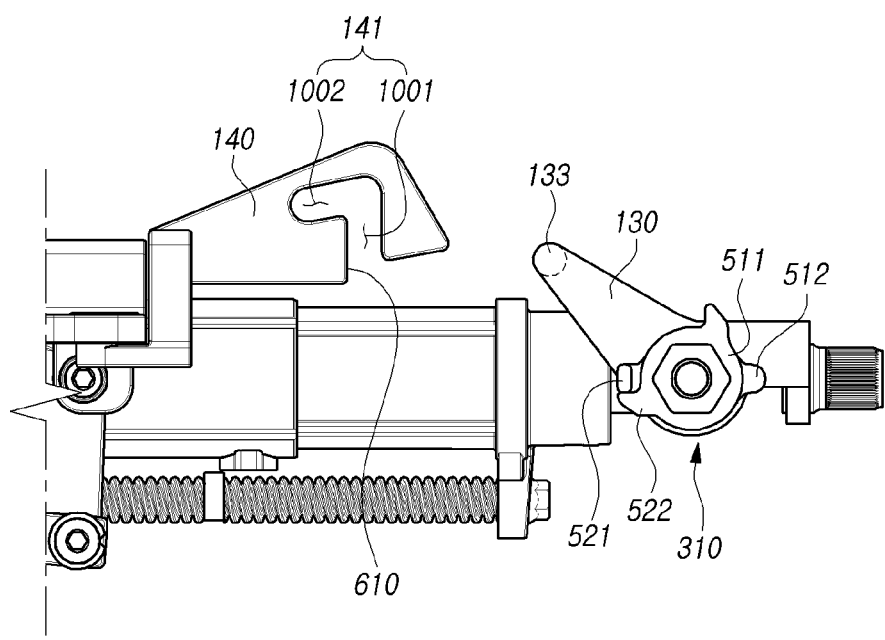
FIG. 10 is a side view illustrating a steering column according to an embodiment.
Figure 11:
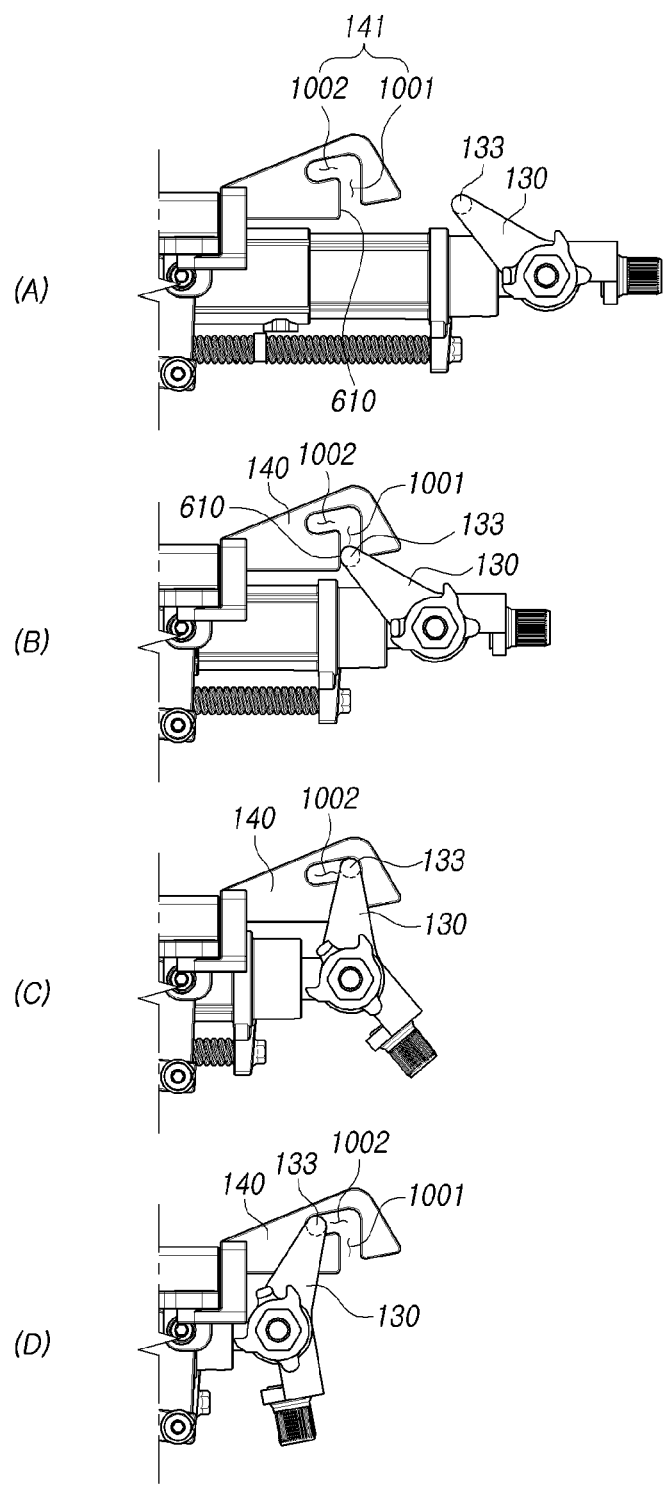
FIG. 11 is a view illustrating an operation state of FIG. 10.

FIG. 1 is a perspective view illustrating a steering column according to an embodiment. FIG. 2 is a perspective view illustrating a folded state of the steering wheel of FIG. 1. FIG. 3 is a perspective view illustrating a steering column according to an embodiment. FIG. 4 is an exploded perspective view of FIG. 1. FIG. 5 is an exploded perspective view illustrating a portion of a steering column according to an embodiment. FIG. 6 is a side view illustrating a steering column according to an embodiment. FIG. 7 is a view illustrating an operation state of FIG. 6. FIG. 8 is a side view illustrating a steering column according to an embodiment. FIG. 9 is a view illustrating an operation state of FIG. 8. FIG. 10 is a side view illustrating a steering column according to an embodiment. FIG. 11 is a view illustrating an operation state of FIG. 10.

According to an embodiment, a steering column 100 having a foldable steering wheel structure includes a shaft 120 crossing and coupled to a steering shaft 110, a driver 150 for moving the steering shaft 110 in a telescopic direction, a rotation bracket 130 including a shaft coupler 131 rotatably coupled to the shaft 120, a steering wheel coupler 132 to which a steering wheel 101 is coupled, and a guide rod 133 spaced apart from the shaft 120 in a direction perpendicular to an axial direction of the steering shaft 110, and a guide bracket 140 including a guide slit 141 through which the guide rod 133 enters or exits as the steering shaft 110 moves in the telescopic direction.

Referring to FIGS. 1 and 2, according to an embodiment, the steering column 100 has a foldable structure in which the steering wheel 101 is coupled to the steering shaft 110 via the rotation bracket 130 and the shaft 120, and the steering wheel 101 rotatively folds or unfolds on the steering shaft 110 as the steering shaft 110 is moved in the telescopic direction by the driver 150 contracting or expanding the steering column 100. The folding operation of the steering wheel 101 is performed by the rotation bracket 130 and the guide bracket 140.

FIG. 1 illustrates a state in which the steering wheel 101 is in a first position which is coaxial with the steering shaft 110, and FIG. 2 illustrates a state in which the steering wheel 101 is in a second position rotated from the first position. The steering wheel 101 rotates about the axis of the shaft 120 to be folded from the first position to the second position or to be unfolded from the second position to the first position. Although the drawings illustrate an example in which the second position of the steering wheel 101 is a position rotated downwards from the first position, embodiments are not limited thereto, and the second position may be a position rotated upwards from the first position.

As illustrated in FIG. 1, the first position of the steering wheel 101 is a position in which the driver may grip and operate the steering wheel 101. In the first position, the steering wheel 101 is positioned coaxially with the steering shaft 110 and, as the driver rotates the steering wheel 101, the rotation bracket 130 and the shaft 120, together with the steering wheel 101, are rotated about the axis of the steering shaft 110. There may be provided a cam unit 310 that may lock the rotation about the shaft 120 of the rotation bracket 130 to allow the steering wheel 101 to be fixed to the first position without rotation about the shaft 120 when the driver operates the steering wheel 101, which is described below in detail.

The shaft 120 is coupled to the steering shaft 110 to be fixed in a rotational direction of the steering shaft 110, and the rotation bracket 130 and the steering wheel 101 are coupled to be fixed in a rotational direction of the steering wheel 101. Accordingly, the torque applied by the driver to the steering wheel 101 when the steering wheel 101 is in the first position is transferred through the rotation bracket 130 and the shaft 120 to the steering shaft 110 and they are rotated together. As illustrated in the drawings, the shaft 120 has a hole through which an end of the steering shaft 110 is inserted, and they may be coupled together via serration.

As the steering column 100 is contracted or expanded by the driver 150 so that the steering shaft 110 telescopes, the rotation bracket 130 is supported by the guide bracket 140 while rotating about the axis of the shaft 120, and the steering wheel 101 coupled to the rotation bracket 130 is moved from the first position to the second position or from the second position to the first position.

The driver 150 for moving the steering shaft 110 in the telescopic direction by contracting or expanding the steering column 100 may include a motor and a bolt screw as illustrated. An end of the bolt screw may be fitted into an aperture, and the motor may be coupled to a lower tube so that the steering shaft 110 is moved by the rotation of a nut screw engaged with the bolt screw. The aperture, lower tube, bolt screw, and nut screw have a well-known structure, and no detailed description thereof is thus given.

Referring to FIG. 2, the second position of the steering wheel 101 is a position in which the steering wheel 101 is received in the vehicle body and may be a position rotated by about 90 degrees from the first position. The steering wheel 101 may be received, e.g., inside the dashboard of the vehicle.

According to an embodiment, the steering column 100 does not include a separate driver for rotating the steering wheel 101 about the shaft 120, and the rotation of the steering wheel 101 about the shaft 120 is performed as the steering column 100 is contracted or expanded by the driver 150. In other words, when the steering column 100 is contracted to receive the steering wheel 101 in the vehicle body, the steering wheel 101 may be seamlessly folded and, when the steering column 100 is expanded to pull the steering wheel 101 out of the vehicle body, the steering wheel 101 may be seamlessly unfolded.

The rotation bracket 130, shaft 120, and guide bracket 140 for folding the steering wheel 101 are briefly described below. The rotation bracket 130 is rotatably coupled to the shaft 120, and the steering wheel 101 is coupled to the rotation bracket 130 and, together with the rotation bracket 130, rotates about the shaft 120. The rotation bracket 130 includes the shaft coupler 131, the steering wheel coupler 132, and the guide rod 133. The shaft coupler 131 is a part that is rotatably coupled to the shaft 120, and the shaft coupler 131 provides a center of rotation to the rotation bracket 130 when the rotation bracket 130 rotates about the shaft 120. The steering wheel coupler 132 is a part that is coupled with the steering wheel 101. For example, the steering wheel coupler 132 includes a serrated portion 132a coupled with the steering wheel 101 to allow the steering wheel 101 the rotation bracket 130 to be fixedly coupled in the rotational direction of the steering wheel 101. However, the coupling between the shaft 120 and the steering wheel 101 and the coupling between the rotation bracket 130 and the steering wheel 101 are not necessarily limited thereto.

The guide rod 133 is a part that is inserted into the guide slit 141 of the guide bracket 140 and is moved along the guide slit 141. The torque for rotating the rotation bracket 130 is applied to the guide rod 133. The guide rod 133 is spaced apart from the shaft 120 in a direction perpendicular to the axial direction of the steering shaft 110. In other words, as illustrated in the drawings, when the steering wheel 101 is in the first position, the steering wheel coupler 132 is positioned on a plane formed by the axis of the steering shaft 110 and the axis of the shaft 120, but the guide rod 133 is not positioned on the plane. In the drawings, the guide rod 133 is positioned above the steering shaft 110. The guide rod 133 may be positioned parallel with the shaft 120.

Since the guide rod 133 is spaced apart from the shaft 120 in the direction perpendicular to the axial direction of the steering shaft 110, as the steering shaft 110 moves in the telescopic direction, the guide rod 133 may be supported by the guide bracket 140 while torque is applied to the rotation bracket 130. Accordingly, the rotation bracket 130 may be rotated about the axis of the shaft 120 while the steering wheel 101 is moved from the first position to the second position or from the second position to the first position.

The guide bracket 140 includes the guide slit 141 through which the guide rod 133 is inserted or removed as the steering column 100 is contracted or expanded. The guide slit 141 has an open end through which the guide rod 133 enters or exits. The guide slit 141 is formed so that the rotation bracket 130 is rotated about the shaft 120 as the guide rod 133 inserted in the guide slit 141 is moved in the guide slit 141. In other words, the guide slit 141 is formed so that the torque for rotating the rotation bracket 130 while the guide rod 133 is inserted into the guide slit 141 and moved along the guide slit 141 until escaping off the guide slit 141 is applied to the guide rod 133.

In other words, as the steering column 100 is contracted or expanded with the guide rod 133 inserted in the guide slit 141, the steering wheel 101 is moved from the first position to the second position or from the second position to the first position. If the steering column 100 is contracted when the steering wheel 101 is in the first position and before the guide rod 133 is inserted into the guide slit 141, the guide rod 133 is inserted into the guide slit 141, and the steering wheel 101 is folded. As the steering column 100 continues to contract, the guide rod 133 moves to an end of the guide slit 141, and the steering wheel 101 moves from the first position to the second position. If the steering column 100 is expanded with the steering wheel 101 in the second position, the opposite operation occurs so that the steering wheel 101 is moved from the second position to the first position. The guide slit 141 may be formed in various shapes which are described below in detail.

It should be noted that the folding operation of the steering wheel 101 is distinguished from the telescoping operation of the steering shaft 110. For example, the telescoping operation of the steering wheel 101 is an operation in which the steering column 100 is contracted or expanded with the steering wheel 101 remaining in the first position and is an operation in which the driver may adjust the position of the steering wheel 101. The folding operation of the steering wheel 101 is an operation in which as the steering column 100 contracts or expands, the steering wheel 101 rotates about the axis of the shaft 120, thus changing the position from the first position to the second position or from the second position to the first position.

In other words, although the telescoping operation of the steering shaft 110 and the folding operation of the steering wheel 101 both are performed by the driver 150, the stroke range of the steering column 100, in which the telescoping operation of the steering shaft 110 is performed, differs from the stroke range of the steering column 100, in which the folding operation of the steering wheel 101 is performed.

A process in which the steering column 100 expanded out to the maximum is contracted is described. Up to a predetermined stroke since the steering column 100 starts to contract, the telescoping operation is performed and, in this case, the steering wheel 101 is not yet received in the vehicle body while remaining in the first position. If the steering column 100 is further contracted over the predetermined stroke where the telescoping operation is performed, the steering wheel 101 is rotated about the axis of the shaft 120 by the rotation bracket 130 and the guide bracket 140 and is moved from the first position to the second position while being received in the vehicle body. The contraction of the steering column 100 may be complete simultaneously when the steering wheel 101 is placed in the second position or, after the steering wheel 101 is placed in the second position, the steering column 100 may be further contracted while the steering wheel 101 maintains its position.

The opposite process, i.e., a process in which the steering column 100 contracted to the maximum is expanded, is described. Until before the steering column 100 starting to expand reaches a predetermined stroke, the steering wheel 101 is not in the first position but is rather in the second position or a position between the second position and the first position. As the steering column 100 continues to expand, the steering wheel 101 is moved from the second position to the first position by the rotation bracket 130 and the guide bracket 140 and, after the steering column 100 reaches the predetermined stroke, it enters the range in which the telescoping operation is performed, so that the steering wheel 101 arrives at the first position and does not rotate about the axis of the shaft 120 any longer.

The configuration of the steering column 100 is described below in greater detail with reference to FIGS. 3 to 5, and then, the shape of the guide bracket 140 and the guide slit 141 is described in detail with reference to FIGS. 6 to 11. For ease of description and a better understanding, the steering wheel 101 is omitted from FIGS. 3 to 11.

Referring to FIG. 3, as described above, the shaft 120 is coupled to the steering shaft 110, the steering wheel 101 is coupled to the rotation bracket 130, and as the rotation bracket 130 is rotatably coupled to the shaft 120, the steering wheel 101 is folded or unfolded on the steering shaft 110 (i.e., performs the folding operation).

According to an embodiment, the steering column 100 includes the driver 150 for performing the telescoping operation of the steering shaft 110 and the folding operation of the steering wheel 101 and a tilting driver for performing a tilting operation of the steering shaft 110. The tilting driver may also include a bolt screw and a nut screw as does the driver 150 and perform the tilting operation of the steering shaft 110. No detailed description is presented.

The guide bracket 140 is positioned ahead of the shaft 120 and the rotation bracket 130 so that the guide rod 133 may enter or exit the guide slit 141 as the steering column 100 contracts or expands. The guide bracket 140 may be coupled and fixed to a mounting bracket 160 for fixing the steering column 100 to the vehicle body as illustrated.

As described above, provided with the shaft 120 is a cam unit 310 to lock the position of the steering wheel 101 to the first position to allow the steering wheel 101 to rotate about the axis of the steering wheel 101 but not to rotate about the axis of the shaft 120 when the driver operates the steering wheel 101. This is described below with reference to FIG. 5.

The shaft coupler 131 of the rotation bracket 130 is a part that is rotatably coupled to the shaft 120. Referring to FIG. 4, a pair of shaft couplers 131 may be provided to be coupled to two opposite ends of the shaft 120. For example, a middle portion of the shaft 120 may be coupled with the steering shaft 110, and the shaft couplers 131 may be coupled to the opposite ends thereof.

The steering wheel coupler 132 and the guide rod 133 may be provided between the pair of shaft couplers 131. In other words, the steering wheel coupler 132 and the guide rod 133 are positioned between the pair of shaft couplers 131 spaced apart from each other in the axial direction of the shaft 120. Thus, the steering wheel 101 coupled with the steering wheel coupler 132 may be positioned coaxial with the steering shaft 110 in the first position, and the guide rod 133 may be positioned parallel with the shaft 120.

M The pair of shaft couplers 131 include rotation coupling parts 431 coupled to the shaft 120, first extensions 432 extending from the rotation coupling parts 431 and having a steering wheel coupler 132 between the respective expanded ends of the first extensions 432, and second extensions 433 extending from the rotation coupling parts 432 and having the guide rod 133 between the respective expanded ends of the second extensions 433.

The rotation coupling part 431 is a part that is rotatably coupled to the shaft 120 and may include a coupling hole 434 through which the shaft 120 is inserted. The shaft 120 has a supporting part 411 supported by the rotation bracket 130 in the axial direction. As illustrated, the supporting part 411 may be formed in an end of the shaft 120, and the rotation bracket 130 may be fitted into the shaft 120 from the opposite side of the supporting part 411. The supporting part 411 may play a role as a stopper for the rotation bracket 130 fitted over the shaft 120, and a thrust bearing 420 may be provided between the supporting part 411 and the rotation bracket 130 to support the rotation of the rotation bracket 130 on the shaft 120.

The rotation coupling part 431 and the steering wheel coupler 132 are connected to each other by the first extension 432, and the rotation coupling part 431 and the guide rod 133 are connected to each other by the second extension 433. Therefore, with respect to the state in which the steering wheel 101 is in the first position, the first extension 432 expands backwards from the rotation coupling part 431, and the second extension 433 may expand forwards, inclined up or down. As the second extensions 433 expand forwards, inclined up or down, the guide rod 133 provided between the respective ends of the second extensions 433 are spaced apart from the shaft 120 in a direction perpendicular to the axial direction of the steering shaft 110.

Referring to FIG. 5, the cam unit 310 includes a fixed cam 511 fixed to the shaft 120 in the circumferential direction and a movable cam 512 coupled to the rotation bracket 130 and supported by the fixed cam 511. When the rotation bracket 130 rotates on the shaft 120, the movable cam 512 rotates along with the rotation bracket 130, but the fixed cam 511 does not. As a chamfered portion 412 is formed in an end of the shaft 120, and the fixed cam 511 is formed to be supported by the chamfered portion 412, the fixed cam 511 may be fixed to the shaft 120 in the circumferential direction. However, the fixed cam 511 may slide on the shaft 120 along the axial direction.

As described above, the supporting part 411 is provided at an end of the shaft 120. The cam unit 310 and the supporting part 411, respectively, are provided at two opposite ends of the shaft 120, with the rotation bracket 130 interposed therebetween. In other words, the supporting part 411 is formed on the opposite side of the cam unit 310 with the rotation bracket 130 disposed therebetween so as to be supported by the rotation bracket 130 in the axial direction, and the rotation bracket 130 is pressurized to the supporting part 411 by the cam unit 310, locking the rotation of the rotation bracket 130.

In other words, a cam surface is formed in the surface where the fixed cam 511 and the movable cam 512 support each other, and a movement in the axial direction is rendered to occur between the fixed cam 511 and the movable cam 512 by the relative rotation between the fixed cam 511 and the movable cam 512. As the rotation bracket 130 is rotated on the shaft 120 by the driver 150, the fixed cam 511 and the movable cam 512 are fitted into each other or unfitted from each other, locking or unlocking the rotation of the rotation bracket 130. A nut 532 is coupled to the cam unit 310-side end of the shaft 120, with a spring 531 interposed between the nut 532 and the fixed cam 511. The spring 531 is supported by the nut 532 while pressurizing the fixed cam 511 to keep the fixed cam 511 and the movable cam 512 in contact with each other.

The rotation of the rotation bracket 130 on the shaft 120 may be locked by the cam unit 310 when the steering wheel 101 is in the first position where the steering wheel 101 is positioned to be coaxial with the steering shaft 110. In other words, the rotation of the steering wheel 101 on the shaft 120 from the second position to the first position may be locked by the cam unit 310, preventing the steering wheel 101 from rotating about the shaft 120 when the driver operates the steering wheel 101. Rotation of the rotation bracket 130 on the shaft 120 may be locked or unlocked when the steering wheel 101 is in the second position.

The fixed cam 511 includes first stoppers 521, and the movable cam 512 includes a second stopper 522. When the steering wheel 101 is in the first position where the steering wheel 101 is positioned coaxial with the steering shaft 110, the first stopper 521 and the second stopper 522 may be supported by each other (see FIG. 6). As the first stopper 521 and the second stopper 522 are supported by each other when the steering wheel 101 is in the first position, the steering wheel 101 moved from the second position to the first position may be stopped in the first position and may thus be prevented from rotating beyond the first position. When the steering wheel 101 is in the second position, the first stopper 521 and the second stopper 522 may be supported by each other as well.

The guide bracket 140 has the guide slit 141 through which the guide rod 133 enters or exits. The guide slit 141 is formed so that the torque for rotating the rotation bracket 130 is applied to the guide rod 133 as the guide rod 133 moves in the guide slit 141. FIG. 6 illustrates an embodiment in which the guide slit 141 is formed in a vertical straight line, and FIG. 8 illustrates an embodiment in which the guide slit 141 is formed in a curved line. FIG. 10 illustrates an embodiment in which the guide slit 141 is formed in both a vertical straight line and a curved line.

What are in common for the embodiments are described. The inlet of the guide slit 141, through which the guide rod 133 enters or exits, is formed to be open in the vertical direction towards the steering shaft 110, that is, downwards in the drawings. Thus, the guide rod 133 moves in the vertical direction when inserted into or removed from the guide slit 141. An end of the guide slit 141 may be open or, as illustrated, may be closed.

When the steering column 100 is contracted or expanded by the driver 150, the guide rod 133 along with the steering shaft 110 is moved in the telescopic direction, e.g., left or right in the drawings. The guide bracket 140 has a guide surface 610 to allow the guide rod 133 moving in the telescopic direction to be inserted into the guide slit 141.

In other words, the guide bracket 140 includes the guide surface 610 that is formed to face backwards in the inlet to guide the guide rod 133 to be inserted into the guide slit 141. The guide surface 610 is directed backwards, to the right in the drawings, and faces the guide rod 133 before the guide rod 133 is inserted into the guide slit 141, and the guide rod 133 is supported by the guide surface 610 and is then inserted into the guide slit 141. Although the guide slit 141 is open in the direction perpendicular to the axial direction of the steering shaft 110, the guide rod 133 moving in the telescopic direction may be inserted into the guide slit 141 by the guide surface 610. The guide surface 610 may be formed as the front surface of two opposite surfaces forming the guide slit 141 extends as illustrated in the drawings.

Each of the embodiments is described below. According to the embodiments, the guide slit 141 may be formed so that the guide rod 133 inserted into the guide slit 141 is moved in the direction perpendicular to the axial direction of the steering shaft 110. In other words, as in the embodiment shown in FIG. 6, the guide slit 141 is formed in a vertical direction.

FIG. 7 stepwise illustrates the folding operation of the steering wheel 101 according to the movement of the guide rod 133 along the guide slit 141 in the embodiment of FIG. 6. (A) of FIG. 7 illustrates a state before the guide rod 133 is inserted into the guide slit 141. The steering wheel 101 is in the first position. (B) of FIG. 7 illustrates a state in which as the steering column is contracted in the state (A) of FIG. 7, the guide rod 133 is supported by the guide surface 610. The steering wheel 101 is still in the first position and, if the steering column is further contracted, the guide rod 133 is inserted into the guide slit 141 while being guided by the guide surface 610. (C) of FIG. 7 illustrates a state in which the steering column is further contracted than in the state (B) of FIG. 7. The guide rod 133 inserted in the guide slit 141 is moved in the vertical direction along the guide slit 141, reaches the end of the guide slit 141, and is positioned as high as possible. The shaft 120 is positioned right under the opening of the guide slit 141. As the guide rod 133 inserted in the guide slit 141 is moved, the rotation bracket 130 is rotated about the axis of the shaft 120, so that the steering wheel 101 is located between the first position and the second position. (D) of FIG. 7 illustrates a state in which as the steering column 100 is further contracted than in the state (C) of FIG. 7, the steering wheel 101 is located in the second position. The shaft 120 is positioned ahead of the inlet of the guide slit 141 and, accordingly, the guide rod 133 is relocated downwards from the end of the guide slit 141. The process in which the steering wheel 101 is moved from the second position to the first position is performed via (D) to (A) of FIG. 7.

According to an embodiment, the guide slit 141 may be formed so that the guide rod 133 inserted in the guide slit 141 is moved in the axial direction of the steering shaft 110 and the direction perpendicular to the axial direction of the steering shaft 110. In other words, unlike in the embodiment of FIG. 6, the guide rod 133 may be simultaneously moved in the upper and lower directions and in the left and right directions. FIG. 8 illustrates an embodiment in which the guide slit 141 is formed in a curved line which is convex upwards, or the guide slit 141 may be formed in an inclined direction.

FIG. 9 stepwise illustrates the folding operation of the steering wheel 101 according to the movement of the guide rod 133 along the guide slit 141 in the embodiment of FIG. 8. (A) of FIG. 8 illustrates a state before the guide rod 133 is inserted into the guide slit 141. The steering wheel 101 is in the first position. (B) of FIG. 9 illustrates a state in which as the steering column is contracted in the state (A) of FIG. 9, the guide rod 133 is supported by the guide surface 610. The steering wheel 101 is still in the first position and, if the steering column is further contracted, the guide rod 133 is inserted into the guide slit 141 while being guided by the guide surface 610. (C) of FIG. 9 illustrates a state in which the steering column is further contracted than in the state (B) of FIG. 9. The guide rod 133 inserted in the guide slit 141 is moved in the upper and right direction along the guide slit 141 and is positioned to be farthest spaced apart from the steering shaft 110 in the upper direction. As the guide rod 133 inserted in the guide slit 141 is moved, the rotation bracket 130 is rotated about the axis of the shaft 120, so that the steering wheel 101 is located between the first position and the second position. (D) of FIG. 9 illustrates a state in which as the steering column 100 is further contracted than in the state (C) of FIG. 9, the steering wheel 101 is located in the second position. The guide rod 133 is moved in the lower and right direction and reaches the end of the guide slit 141. The process in which the steering wheel 101 is moved from the second position to the first position is performed via (D) to (A) of FIG. 7.

According to an embodiment, the guide slit 141 may include a first section 1001 in which the guide rod 133 inserted in the guide slit 141 is moved in the direction perpendicular to the axial direction of the steering shaft 110 and a second section 1002 in which the guide rod 133 is moved in both the axial direction of the steering shaft 110 and the direction perpendicular to the axial direction of the steering shaft 110. In other words, the guide slit 141 may include a section in which the guide slit 141 is formed in the vertical direction as in the embodiment of FIG. 6 and a section in which the guide slit 141 is formed in a curved line or oblique line as in the embodiment of FIG. 8. FIG. 10 illustrates an embodiment in which the first section 1001 is formed vertically upwards from the inlet of the guide slit 141 and the second section 1002 is formed in an oblique direction from the top of the first section to the bottom left end. Although it is illustrated that the guide rod 133 inserted through the opening of the guide slit 141 enters through the first section 1001 to the second section 1002, the opposite may also apply. Alternatively, there may be separately and alternately provided a plurality of first sections 1001 or a plurality of second sections 1002.

FIG. 11 stepwise illustrates the folding operation of the steering wheel 101 according to the movement of the guide rod 133 along the guide slit 141 in the embodiment of FIG. 10. (A) of FIG. 11 illustrates a state before the guide rod 133 is inserted into the guide slit 141. The steering wheel 101 is in the first position. (B) of FIG. 11 illustrates a state in which as the steering column is contracted in the state (A) of FIG. 11, the guide rod 133 is supported by the guide surface 610. The steering wheel 101 is still in the first position and, if the steering column is further contracted, the guide rod 133 is inserted into the guide slit 141 while being guided by the guide surface 610. (C) of FIG. 11 illustrates a state in which the steering column is further contracted than in the state (B) of FIG. 11. The guide rod 133 which has been inserted into the guide slit 141 and entered the first section 1001 is moved in the vertical direction along the first section 1001 and, as illustrated, reaches the top of the first section 1001. The guide rod 133 is positioned at the uppermost side, and the shaft 120 is positioned right under the opening of the guide slit 141. As the guide rod 133 enters the first section 1001 and moves, the rotation bracket 130 is rotated about the axis of the shaft 120, so that the steering wheel 101 is located between the first position and the second position. (D) of FIG. 11 illustrates a state in which as the steering column 100 is further contracted than in the state (C) of FIG. 11, the steering wheel 101 is located in the second position. The guide rod 133 leaves the first section 1001 and enters the second section 1002. As the guide rod 133 reaches the end of the second section 1002, the steering wheel 101 is located in the second position. The process in which the steering wheel 101 is moved from the second position to the first position is performed via (D) to (A) of FIG. 7.

The steering column having a foldable steering wheel structure having the above described shape may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering column having a foldable steering wheel structure, comprising:
    a shaft crossing and coupled to a steering shaft;
    a driver for moving the steering shaft in a telescopic direction;
    a rotation bracket including at least one shaft coupler rotatably coupled to the shaft, a steering wheel coupler to which a steering wheel is coupled, and a guide rod spaced apart from the shaft in a direction perpendicular to an axial direction of the steering shaft; and
    a guide bracket including a guide slit through which the guide rod enters or exits as the steering shaft moves in the telescopic direction.

2. The steering column of claim 1, wherein the guide slit is formed to allow the rotation bracket to rotate about the shaft as the guide rod inserted into the guide slit moves in the guide slit.

3. The steering column of claim 1, wherein the at least one shaft coupler includes a pair of shaft couplers coupled to two opposite ends of the shaft, and wherein the steering wheel coupler and the guide rod are provided between the pair of shaft couplers.

4. The steering column of claim 3, wherein the pair of shaft couplers include rotation coupling parts coupled to the shaft, first extensions extending from the rotation coupling parts and having the steering wheel coupler between respective ends thereof, and second extensions extending from the rotation coupling parts and having the guide rod between respective ends thereof.

5. The steering column of claim 4, wherein the rotation coupling part includes a coupling hole through which the shaft is inserted.

6. The steering column of claim 1, further comprising a cam unit including a fixed cam fixed to the shaft in a circumferential direction, and a movable cam coupled to the rotation bracket and supported by the fixed cam.

7. The steering column of claim 6, wherein the shaft includes a supporting part on an opposite side of the cam unit, with the rotation bracket disposed between the cam unit and the supporting part, and supported by the rotation bracket in the axial direction, and wherein the rotation bracket is pressurized towards the supporting part by the cam unit to lock rotation of the rotation bracket.

8. The steering column of claim 6, wherein rotation of the rotation bracket on the shaft is locked by the cam unit when the steering wheel is positioned coaxial with the steering shaft.

9. The steering column of claim 6, wherein the fixed cam includes a first stopper, and the movable cam includes a second stopper, and wherein the first stopper and the second stopper are supported by each other when the steering wheel is positioned coaxial with the steering shaft.

10. The steering column of claim 1, wherein the guide bracket includes a guide surface formed to face backwards in an inlet of the guide slit to guide the guide rod to be inserted into the guide slit.

11. The steering column of claim 1, wherein the guide slit is formed to allow the guide rod inserted in the guide slit to move a direction perpendicular to the axial direction of the steering shaft.

12. The steering column of claim 1, wherein the guide slit is formed to allow the guide rod inserted in the guide slit to move in both the axial direction of the steering shaft and a direction perpendicular to the axial direction of the steering shaft.

13. The steering column of claim 1, wherein the guide slit includes a first section in which the guide rod inserted in the guide slit moves in a direction perpendicular to the axial direction of the steering shaft and a second section in which the guide rod moves in both the axial direction of the steering shaft and the direction perpendicular to the axial direction of the steering shaft.

* * * * *